(12) United States Patent
Goldman et al.

(10) Patent No.: US 7,764,974 B2
(45) Date of Patent: Jul. 27, 2010

(54) TRANSMISSION POWER LEVEL REGULATION FOR HIGH PRIORITY WIRELESS CALLS

(75) Inventors: Stuart O. Goldman, Scottsdale, AZ (US); Richard E. Krock, Naperville, IL (US); Karl F. Rauscher, Emmaus, PA (US); James P. Runyon, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 475 days.

(21) Appl. No.: 11/895,146

(22) Filed: Aug. 23, 2007

(65) Prior Publication Data

US 2009/0054057 A1    Feb. 26, 2009

(51) Int. Cl.
*H04Q 7/20* (2006.01)
(52) U.S. Cl. .................. 455/522; 455/69; 455/127.1; 455/500; 455/512; 455/404.1; 370/310; 370/328; 370/329; 370/343; 370/480
(58) Field of Classification Search .............. 455/522, 455/69, 517, 500, 127.1, 404.1, 404.2, 414.1–414.4, 455/422.1, 403, 550.1, 445, 456.1–457, 512, 455/509, 451–452.3; 370/310, 328, 329, 370/343, 480
See application file for complete search history.

(56) References Cited

U.S. PATENT DOCUMENTS

| | | | |
|---|---|---|---|
| 6,072,784 A * | 6/2000 | Agrawal et al. | 370/311 |
| 6,449,461 B1 * | 9/2002 | Otten | 455/63.1 |
| 2007/0225012 A1 * | 9/2007 | Chang et al. | 455/452.2 |
| 2008/0032726 A1 * | 2/2008 | Tajima et al. | 455/509 |

* cited by examiner

*Primary Examiner*—Keith T Ferguson
(74) *Attorney, Agent, or Firm*—Fay Sharpe LLP

(57) ABSTRACT

A method is provided for regulating transmission power levels for wireless calls. The method includes: determining whether or not a mobile station (MS) (90) is outside a service area of a wireless telecommunications network (70); detecting whether or not a call placed by the MS (90) is a priority call; setting a transmission power level of the MS (90) in response to the MS (90) being outside the service area of the wireless network (70) and detecting that the call placed by the MS (90) is a priority call; transmitting call set-up signaling from the MS (90) at the transmission power level set for the MS (90); determining whether or not a base station (BS) (82) of the wireless network (70) receives the call set-up signaling from the MS (90); setting a transmission power level of the BS (82) in response to the BS (82) receiving the call set-up signaling from the MS (90); and, transmitting a reply to the call set-up signaling from the BS (82) at the transmission power level set for the BS (82).

20 Claims, 4 Drawing Sheets

10

TRANSMISSION POWER LEVEL REGULATION FOR HIGH PRIORITY WIRELESS CALLS

FIELD

The present inventive subject matter relates to the wireless telecommunication arts. Particular application is found in conjunction with certain types of wireless telecommunication devices, networks and/or facilities, and the specification makes particular reference thereto. However, it is to be appreciated that aspects of the present inventive subject matter are also amenable to other like applications, devices, networks and/or facilities.

BACKGROUND

Wireless networks (i.e., cellular and/or other like mobile networks) are generally known in the telecommunication arts. In a typical example, a mobile station (MS), e.g., such as a mobile or cellular telephone or other like end user device or terminal, is provided access to the wireless network via a radio frequency (RF) or other suitable over-the-air (OTA) interface. More specifically, a typical wireless network is generally made up of a plurality of base stations that are capable of wirelessly exchanging RF or other suitable signals and/or communications with one or more mobile stations. Each base station (BS) generally serves a corresponding geographic area, e.g., which is commensurate in scope with the normal operative range of the BS. The geographic area served by a BS is commonly known as a "cell." As is generally known in the art, each BS normally provides the aforementioned RF or other OTA interface to the MS when the MS is located within the cell served by the particular BS.

With reference to FIG. 1, there is illustrated an exemplary wireless network 10 including a plurality of cells each served by a respective BS (not shown in FIG. 1). As illustrated, an individual cell is indicated generally by a corresponding hexagonal area. Typically, each cell employs a pair of control channels and a plurality of voice or traffic channels that make up the OTA interface provided in that cell. The control channels are generally used to exchange call set-up, registration and/or other like control signaling between the BS and MS. The one control channel typically used to transmit control signaling from the BS to the MS is generally referred to merely as the control channel or the forward control channel, and the other control channel typically used to transmit control signaling from the MS to the BS is generally referred to as the reverse control channel. The plurality of voice or traffic channels are generally used to exchange call traffic between the BS and MS. Within a given cell, the channels are conventionally defined and/or distinguished by different frequencies that are assigned or designated for the various channels. Accordingly, each cell employs a set of distinct frequencies that define and/or distinguish the different channels established therein.

Generally, to prevent interference between cells, adjacent or nearby cells employ different frequency sets for their respective channels. However, the frequency sets are typically reused periodically by sufficiently spaced apart cells. For example, the cell 20 may employ a first set of frequencies that define and/or distinguish the respective channels used in cell 20. Accordingly, the cell 30 employs a second set of frequencies (different from the first set) that define and/or distinguish the respective channels used in cell 30; the cell 31 employs a third set of frequencies (different from the first and second sets) that define and/or distinguish the respective channels used in cell 31; the cell 32 employs a fourth set of frequencies (different from the first, second and third sets) that define and/or distinguish the respective channels used in cell 32; and so on for the cells 33, 34 and 35. However, as cell 40 is sufficiently spaced apart from cell 20, the cell 40 may reuse the first set of frequencies to define and/or distinguish the respective channels used in cell 40.

Additionally, with reference now to FIG. 2, the BS 22 serving each cell is generally equipped or otherwise provisioned to selectively vary the power level used to sent transmissions over particular channels within the cell served by the BS 22. For example, the BS 22 is typically able to employ a plurality of different transmission powers levels on a channel-by-channel basis. That is to say, the BS 22 may use a first power level for transmissions being sent over a first channel, while using a second power level (different from the first power level) for transmissions being sent over a second channel (different from the first channel). In this way, the BS 22 is able to adjust the transmission power level used in particular instances, e.g., based upon a detected proximity of an MS for which a given transmission is intended. For example, if a transmission is intended for an MS 50 (which is relatively close to the BS 22), then the power level for that transmission is selected or otherwise set relatively low. Conversely, if a transmission is intended for an MS 52 (which is relatively far from the BS 22), then the power level for that transmission is selected or otherwise set relatively high.

Likewise, the MS is also typically equipped or otherwise provisioned to transmit at a variety of different power levels. Normally, the MS selects or otherwise sets its transmission power level based upon a signal received from the BS serving the MS. For example, the aforementioned signal commonly serves as a request, command or instruction from the BS for the MS to transmit at a particular selected power level based upon a detected proximity of the MS to the BS serving that MS.

In a typical example, wireless network operators or the like adopt and/or implement an intercellular interference plan that regulates the different transmission power levels used by base stations and mobile stations under normal operating conditions. That is to say, generally the intercellular interference plan dictates the different transmission power levels to be used by the various base stations and mobile stations in particular circumstances based upon one or more factors, e.g., such as the location and/or topology of the cell in which the BS and/or MS resides, the distance between the BS and the MS being served by the BS, the relative proximity of the BS and/or MS to other cells, etc.

Commonly, in accordance with the intercellular interference plan, the transmission power levels used by the BS 22 under normal operating conditions are typically less than a maximum power level at which the BS 22 is capable of transmitting. In this way, the effective range of transmissions from the BS 22 is normally limited to the cell being served by the BS 22. Additionally, limiting the transmission power levels normally used to something less than the maximum level at which the BS 22 is capable of transmitting guards against interference with other cells that may be using the same set of frequencies for their channels. Similarly, minimizing the transmission power level used by the MS during normal operation, while still assuring that transmissions from the MS are powerful enough to reach the BS currently serving the MS, aids in extending a battery life of the MS and limits the potential for interference with other cells. Therefore, traditional intercellular interference plan are also typically designed to regulate MS transmission power levels accordingly.

Collectively, the combination of cells within a network generally define the normal "service area" of the wireless network, i.e., the geographic area in which the MS is normally provided access to the wireless network. As can be appreciate, when the MS is located within the normal geographic boundaries of the service area (SA), it may selectively access the wireless network, e.g., via the RF or other OTA interface provided by the BS serving the cell in which the MS is located. Conversely, when the MS is outside the normal geographic boundaries of the SA, it is generally not able to access the wireless network insomuch as the MS is outside of any cell served by a BS of the wireless network—that is to say, the MS is generally out of the usual range of any suitable network BS and therefore cannot utilize any corresponding RF or other OTA interface which would normally be provided by the BS. Typically, when an MS exits the normal SA of a wireless network and/or is no longer registered with the wireless network, the MS will display a suitable notification (e.g., such as "No Signal" or "Out of Service Area" or "Network Not Found" or the like) and will not allow a user to place a call with the MS or will otherwise not attempt to access the wireless network.

Nevertheless, in certain instances the MS may be just outside the normal SA of the network but otherwise nearby, and a user may at times still desire to place a call or otherwise access the wireless network. This is particularly true in the case of an emergency, e.g., such as when the user desires to place an emergency 9-1-1 call or utilize a service such as GETS (Government Emergency Telecommunication Service) or WPS (Wireless Priority Service). However, conventional mobile stations and/or wireless networks are not equipped or otherwise provisioned to effectively attempt completion of such calls when the MS is outside the normal SA of the wireless network. Accordingly, to place such a call or utilize such a service, the user conventionally had to move into the normal SA of the wireless network. This is not, however, always an option. For example, for whatever reason, the user may be unable to move or reach the normal SA or may be uncertain of its direction from their current location.

Accordingly, a new and improved wireless telecommunications system and/or method is disclosed that overcomes the above-referenced problems and others.

SUMMARY

In accordance with one embodiment, a method is provided for regulating transmission power levels for wireless calls. The method includes: determining whether or not a mobile station (MS) is outside a service area of a wireless telecommunications network; detecting whether or not a call placed by the MS is a priority call; setting a transmission power level of the MS in response to the MS being outside the service area of the wireless network and detecting that the call placed by the MS is a priority call; transmitting call set-up signaling from the MS at the transmission power level set for the MS; determining whether or not a base station (BS) of the wireless network receives the call set-up signaling from the MS; setting a transmission power level of the BS in response to the BS receiving the call set-up signaling from the MS; and, transmitting a reply to the call set-up signaling from the BS at the transmission power level set for the BS.

In accordance with another embodiment, a system is provided in a wireless telecommunications network for regulating transmission power levels for wireless calls. The system includes: first determining means for determining whether or not a mobile station (MS) is outside a service area of a wireless telecommunications network; detecting means for detecting whether or not a call placed by the MS is a priority call; first power level setting means for setting a transmission power level of the MS in response to the MS being outside the service area of the wireless network and detecting that the call placed by the MS is a priority call; first transmitting means for transmitting call set-up signaling from the MS at the transmission power level set by the first power level setting means; second determining means for determining whether or not a base station (BS) of the wireless network receives the call set-up signaling from the MS; second power level setting means for setting a transmission power level of the BS in response to the BS receiving the call set-up signaling from the first transmitting means; and, second transmitting means for transmitting a reply to the call set-up signaling, the reply being transmitted by the second transmitting means from the BS at the transmission power level set by the second power level setting means.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunication arts without further detailed explanation as to their configuration or operation except to the extent they have been modified or altered in accordance with and/or to accommodate the preferred embodiment(s) presented herein.

Generally, the present specification relates to a wireless telecommunications network and/or method used in connection with the wireless network. More specifically, a wireless network and/or method is disclosed in which a mobile station (MS) is able to obtain access to the network for placing emergency calls (e.g., such as a 9-1-1 call) and/or to utilize selected emergency telecommunication services (e.g., such as GETS or WPS) even if the MS is located outside the normal service area (SA) of the network and/or is otherwise not registered with the network.

Figure 1:
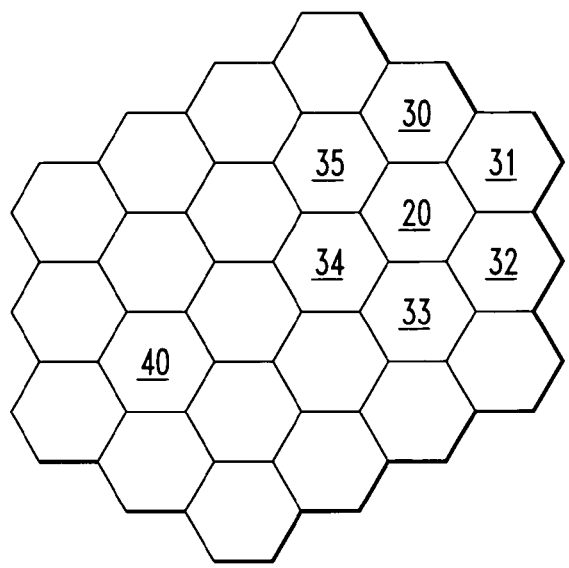
FIG. 1 is a graphical illustration showing a conventional arrangement of cells in an exemplary wireless telecommunications network.
Figure 2:
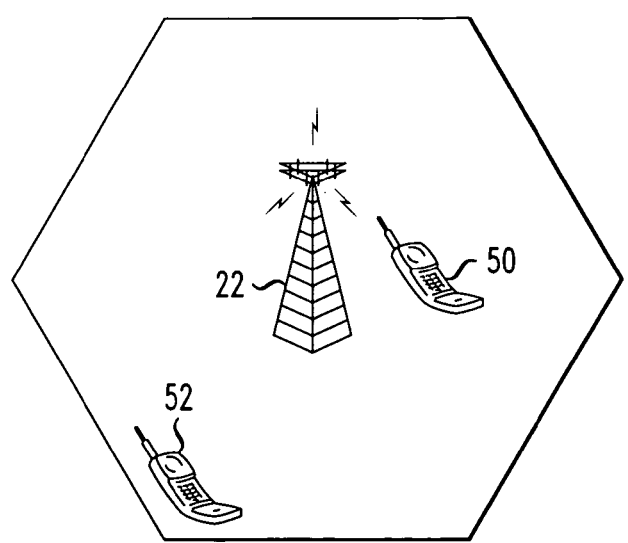
FIG. 2 is a graphical illustration showing a base station communicating in a conventional manner with mobile stations in a cell served by the base station.
Figure 3:
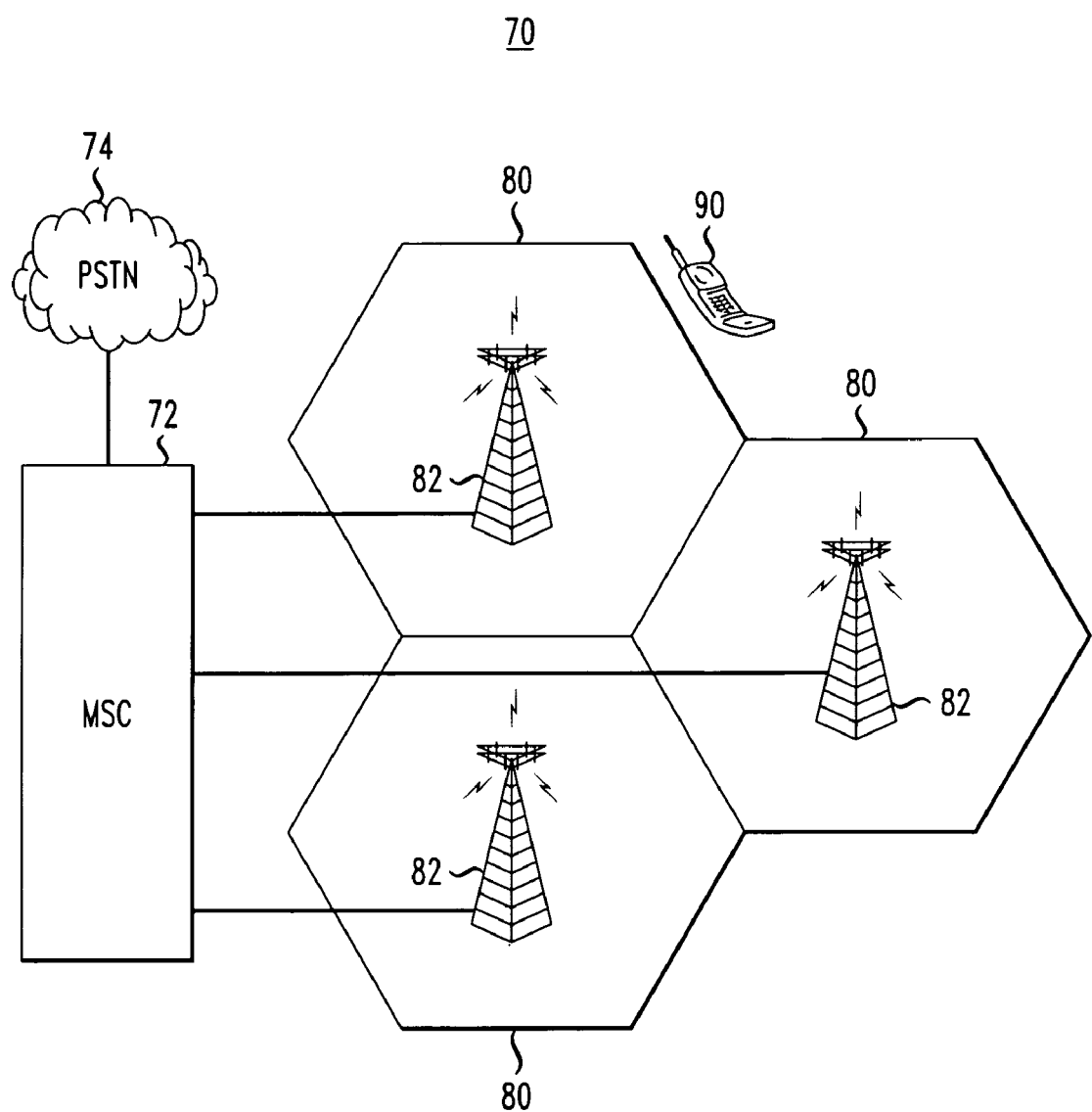
FIG. 3 is a graphical illustration showing an exemplary wireless communication network suitable for providing a mobile station outside the normal service area of the network access to the network for high priority calls or services.

With reference now to FIG. 3, there is illustrated an exemplary wireless network 70 suitable for practicing aspects of the present inventive subject matter. As shown, the network 70 includes a plurality of cells 80 each served by a respective BS 82. An individual cell 80 is indicated generally in FIG. 3 by a corresponding hexagonal area. For simplicity and clarity herein, three base stations 82 and three corresponding cells 80 are illustrated in FIG. 3. However, it is to be appreciated that in practice more or less than three base stations 82 and/or cells 80 may be similarly provided within the network 70. Additionally, the wireless telecommunications network 70 includes a mobile switching center (MSC) 72 that may optionally be operatively connected to and/or in communication with a public switched telephone network (PSTN) 74 in the usual manner. Suitably, the MSC 72 is also operatively connected to and/or in communication with the plurality of base stations 82 in the usual manner. Again, while only one MSC is illustrated in FIG. 3 for purposes of simplification and clarity, it is to be appreciated that the network 70 may in fact include any number of one or more MSCs that are similarly situated and/or arranged.

Collectively, the combination of cells 80 within the network 70 generally define the normal "service area" of the wireless network 70, i.e., the geographic area in which an MS is normally provided access to the wireless network 70. As can be appreciate, when an MS is located within the normal geographic boundaries of the service area (SA), it may selectively access the wireless network 70 in the usual manner, e.g., via an RF or other OTA interface provided by the BS 82 serving the cell 80 in which the MS is located.

Suitably, in the usual manner, each cell 80 employs a pair of control channels and a plurality of voice or traffic channels that make up the OTA interface provided in that cell 80. That is to say, the control channels are generally used to exchange call set-up, registration and/or other like control signaling between a BS 82 and the mobile stations being served by that BS 82. The one control channel used to transmit control signaling from the BS 82 to the mobile stations being served by the BS 82 is generally referred to merely as the control channel or the forward control channel, and the other control channel typically used to transmit control signaling from the mobile stations to the BS 82 is generally referred to as the reverse control channel. The plurality of voice or traffic channels are generally used to exchange call traffic between the BS 82 and the mobile stations being served by the BS 82. Suitably, within a given cell 80, the channels are defined and/or distinguished by different frequencies that are assigned or designated for the various channels. Accordingly, each cell 80 employs a set of distinct frequencies that define and/or distinguish the different channels established therein. In a suitable embodiment, to prevent interference between cells 80, adjacent or nearby cells 80 employ different frequency sets for their respective channels. However, the frequency sets are optionally reused periodically by sufficiently spaced apart cells 80.

The BS 82 serving each cell 80 is also equipped or otherwise provisioned to selectively vary the power level used to sent transmissions over particular channels within the cell 80 served by the BS 82. Suitably, the BS 82 is selectively able to employ a plurality of different transmission (TX) power levels on a channel-by-channel basis. For example, the BS 82 may use a first TX power level for transmissions being sent over a first channel, while using a second TX power level (different from the first TX power level) for transmissions being sent over a second channel (different from the first channel). Suitably, under normal operating conditions, the BS 82 adjusts the TX power level used in particular instances, e.g., based upon a detected proximity of an MS for which a given transmission is intended.

FIG. 3 also shows a MS 90 that is located just or nearly outside the normal SA of the network 70. The MS 90 is optionally provisioned with the usual components and/or elements, e.g., a central processing unit (CPU) and/or operating system that controls and regulates operation of the MS 90; a keypad with traditional numeric buttons, a number of soft and/or hard buttons, navigation buttons, etc.; a liquid crystal display (LCD), touch sensitive screen, or other suitable display; a graphical user interface (GUI); a memory or other data storage device; and, other components commonly found on and/or incorporated in an MS. For example, an input/output (I/O) interface provided on the MS 90 is employed for user interaction with and/or operation of the MS 90. Suitably, the interface includes: a microphone, a speaker or other audio transducer, a display and a keypad, as is typical for a conventional MS.

Suitably, the MS 90 is also equipped or otherwise provisioned in the usual manner to transmit at a variety of different power levels. Normally, the MS 90 selects or otherwise sets its transmission power level based upon a signal received from a BS serving the MS 90. For example, the aforementioned signal commonly serves as a request, command or instruction from the BS for the MS 90 to transmit at a particular selected TX power level based upon a detected proximity of the MS 90 to the BS.

In one suitable embodiment, the operator of the wireless network 70 adopts and/or implements an intercellular interference plan that regulates the different TX power levels used by the base stations 82 and/or mobile stations under normal operating conditions. Suitably, the intercellular interference plan dictates the different TX power levels to be used by the various network elements in particular circumstances based upon one or more factors, e.g., such as the location and/or topology of the cell 80 in which the BS 82 and/or MS resides, the distance between the BS 82 and the MS being served by the BS 82, the relative proximity of the BS 82 and/or MS to other cells 80, etc. In accordance with the intercellular interference plan, the TX power levels used by a BS 82 under normal operating conditions are typically less than a maximum TX power level at which the BS 82 is capable of transmitting. In this way, the effective range of transmissions from the BS 82 is normally limited to the cell 80 being served by the BS 82. Additionally, in accordance with the intercellular interference plan, the TX power levels used during normal operation by an MS located within the normal SA of the network 70 are also typically less than a maximum TX power level at which the MS is capable of transmitting.

Figure 4:
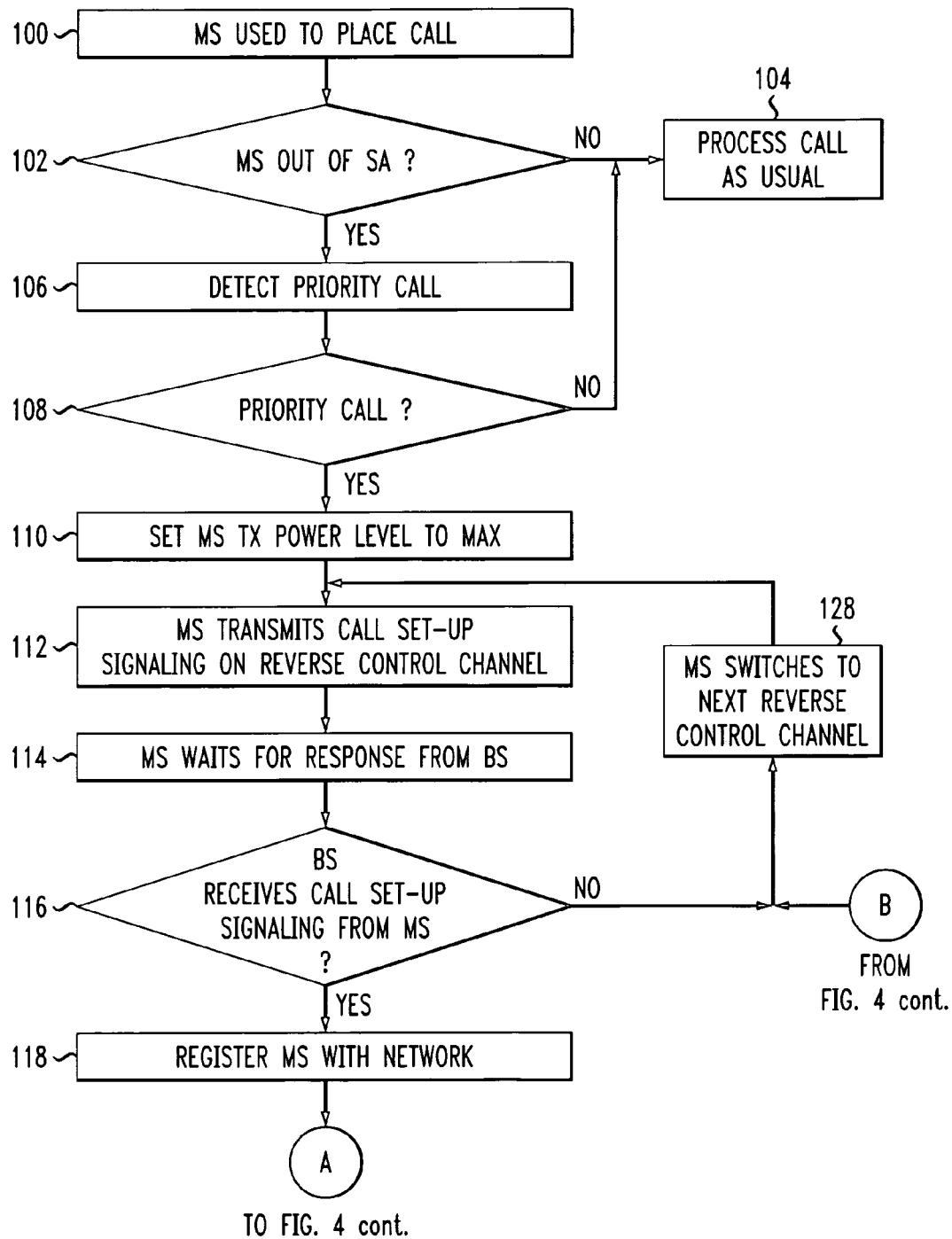
FIG. 4 is a flow chart showing an exemplary process embodying aspects of the present inventive subject matter.
Figure 4:
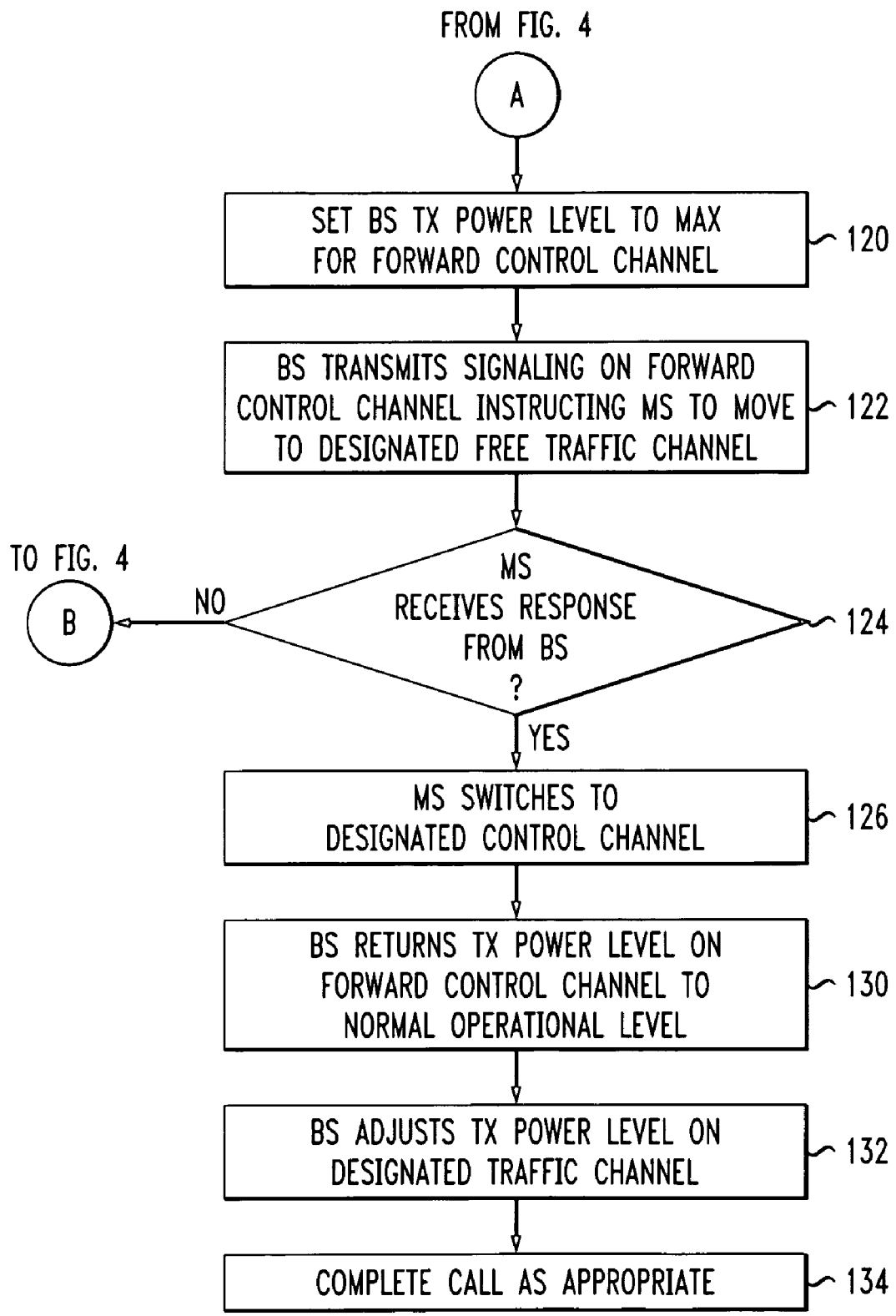

In any event, as shown in FIG. 3, the MS 90 is just outside the normal SA of the network 70 but is otherwise nearby, and a user may still desire to place a call or otherwise access the wireless network 70. This is particularly true in the case of an emergency, e.g., such as when the user desires to place an emergency 9-1-1 call or utilize a service such as GETS (Government Emergency Telecommunication Service) or WPS (Wireless Priority Service). However, conventional mobile stations and/or wireless networks are not equipped or otherwise provisioned to effectively attempt completion of such calls when the MS is outside the normal SA of the wireless network. Accordingly, with additional reference now to FIG. 4, the following process and/or method is implemented by the MS 90 and/or wireless network 70 in the forgoing circumstance.

Suitably, the process begins at step 100, with a user manipulating or otherwise employing the MS 90 to place or originate a call or otherwise access a selected service via the wireless telecommunications network 70. For example, the user optionally dials or otherwise enters a desired telephone number and/or access code for a selected service.

At decision step 102, it is determined if the MS 90 is outside the normal SA of the network 70 and/or otherwise not registered with the network 70 at or around the time when the call is originated or the code is entered in step 100. Optionally, the MS 90 makes this determination based upon information and/or data obtained and/or otherwise maintained in the normal course of operation. Suitably, for example, in the normal course of operation, the MS 90 records, knows or otherwise has access to its registration status and/or information regarding its relative location with respect to the normal SA of the network 70 (i.e., inside or outside). As is known in the art, this information is commonly used by the MS 90 for determining when to display notifications, e.g., such as "No Signal" or "Out of Service Area" or "Network Not Found" or the like.

In any event, if at decision step 102 it is determined that the MS 90 is inside the normal SA and/or is registered with the network 70, then the process branches to step 104 and the originated call is conventionally processed and/or the selected service accessed as usual, e.g., the call is competed in accordance with the dialed telephone number or entered code. Otherwise, if at decision step 102 it is determined that the MS 90 is outside the normal SA of the network 70 and/or is not registered with the network 70, then the process continues on to step 106.

Suitably, at step 106, the MS 90 detects if the call or request for service is an emergency or priority call or request for service. For example, the MS 90 optionally monitors the telephone number or code dialed or otherwise enter in step 100 to detect if the call or request for service relates to an emergency or priority situation. Suitably, if the dialed telephone number is an emergency number (e.g., such as 9-1-1) or the service access code is associated with an emergency service (e.g., such as GETS or WPS), then the call or request for service is deemed an emergency call or priority service request. Accordingly, at decision step 108, it is determined whether or not the call or request for service is an emergency call or priority service request. If the call or request for service is not an emergency call or not a priority service request, then the process branches to step 104 and the call or service request is conventionally processed as usual. Generally, in this case, the call or service request fails (i.e., the call is not completed and/or access to the network 70 is denied) because the call or service request is not an emergency call or priority service request and the MS 90 is outside the normal SA of the network 70 and/or is not registered with the network 70. Otherwise, if at decision step 108 it is determined that the call or request for service is an emergency call or priority service request, then the process continues on to step 110 for priority handling.

In accordance with the priority handling, at step 110, the TX power level of the MS 90 is set to the maximum power level at which the MS 90 is capable of transmitting or otherwise increased above the normal TX power level prescribed by the intercellular interference plan implemented in the network 70. At step 112, the MS 90 transmits the appropriate call set-up, call origination, service request or other suitable signaling for seeking access to the network 70 at the TX power level selected in step 110. Suitably, the MS 90 records or otherwise remembers the last reverse control channel successfully used to access or otherwise communicate with the wireless network 70. Accordingly, the signaling transmitted in step 112 is first transmitted on this remembered reverse control channel.

At step 114, the MS 90 waits a set or otherwise determined amount of time for a response from a BS 82 to the signaling transmitted in step 112. That is to say, if a BS 82 within the network 70 is using the same reverse control channel and the MS 90 is close enough to the BS 82 (albeit otherwise outside the normal SA of the network 70), then BS 82 may still receive the signaling transmitted from the MS 90 in step 112. Notably, the base stations 82 typically have better reception capabilities (e.g., as compared to mobile stations) and can at times still receive transmissions even from mobile stations that are otherwise outside of the cells 80 normally served by the base stations 82. In any event, if a BS 82 does indeed receive the signaling transmitted from the MS 90 in step 112 on the matching reverse control channel used to send the transmission and used by the BS 82 receiving the transmission, then the BS 82 will in turn transmit an appropriate response on the corresponding forward control channel, as described below. Otherwise, if no base stations 82 within the network 70 receive the signaling transmitted from the MS 90 in step 112 on the appropriate reverse control channel used to send the transmission and used by the respective base stations 82, then no response will be forthcoming.

Accordingly, at decision step 116, it is determined whether or not a BS 82 receives the signaling transmitted in step 112 on the matching reverse control channel used for the transmission and used by the BS 82. If a BS 82 has received the signaling on the appropriate reverse control channel, then the process continues to step 118 for generation of an appropriate response, otherwise if a BS 82 has not received the signaling on the appropriate reverse control channel, then the process skips to step 128 without the generation of an appropriate response.

At step 118, the MS 90 is registered with the network 70 by the BS 82 receiving the signaling from the MS 90 sent in step 112 on the reverse control channel used by the BS 82. Suitably, at step 120, the BS 82 also sets the TX power level on its forward control channel to the maximum power level at which the BS 82 is capable of transmitting or otherwise increases the TX power level on its forward control channel above the normal TX power level prescribed by the intercellular interference plan implemented in the network 70 so as to be sufficient to reach the MS 90. Then at step 122, the BS 82 responds to the signaling sent by the MS 90 in step 112 by transmitting on the forward control channel at the power level set in step 120 signaling which requests, instructions or otherwise directs the MS 90 to move or switch to a designated free traffic channel employed by the BS 82.

Consequently, at decision step 124, it is determined whether or not the MS 90 receives a response from the BS 82 on the forward control channel. If the response from the BS 82 has been generated and is in turn received by the MS 90, then the process continues to step 126 and the MS 90 complies with the request or instruction by moving or switching to the designated traffic channel. Otherwise, if no response is generated by a BS 82 or a generated response is not received by the MS 90, then the process branches to step 128. At step 128, the MS 90 switches to the next or lowest reverse control channel and the process returns back to step 112 for another iteration. Suitably, the process continues looping through iterations while progressing through successive reverse control channels at step 128 until the process exits the loop by advancing to step 126.

In any event, at step 130, the BS 82 returns or otherwise sets the TX power level on its forward control channel back to a normal operational level, e.g., in accordance with the intercellular interference plan implemented in the network 70. At step 132, the BS 82 also sets the TX power level on the designated traffic channel to the maximum power level at which the BS 82 is capable of transmitting. Alternately, without being constrained by or without regard to the intercellular interference plan otherwise implemented in the network 70, the BS 82 optionally adjusts the TX power level it uses on the designated traffic channel to be just sufficiently strong enough to ensure that transmissions from the BS 82 on the designated traffic channel reach or are otherwise received by the MS 90. Suitably, the TX power level used by the BS 82 on the designated traffic channel is set or otherwise selected base upon, e.g., a detected power level of the transmission received by the BS 82 as a result of the signaling sent from the MS 90 in step 112.

Finally, at step 134, having established communication with and/or access to the wireless network 70 via the designated traffic channel between the BS 82 and the MS 90, the call is suitably connected or completed or the requested service is otherwise provided as appropriate in the particular instance—i.e., in accordance with the dialed emergency telephone number or otherwise entered priority service access code from step 100. For example, the call is optionally routed to the appropriate PSAP (Public Safety Access Point) if 9-1-1 was dialed in step 100, or the appropriate GETS or WPS access is provided or the call routed to the appropriate GETS/WPS carrier if the suitable priority service access code and/or number was entered in step 100.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for regulating transmission power levels for wireless calls, said method comprising:
   (a) determining whether or not a mobile station (MS) is outside a service area of a wireless telecommunications network;
   (b) detecting whether or not a call placed by the MS is a priority call;
   (c) setting a transmission power level of the MS in response to the MS being outside the service area of the wireless network and detecting that the call placed by the MS is a priority call;
   (d) transmitting call set-up signaling from the MS at the transmission power level set for the MS;
   (e) determining whether or not a base station (BS) of the wireless network receives the call set-up signaling from the MS;
   (f) setting a transmission power level of the BS in response to the BS receiving the call set-up signaling from the MS; and,
   (g) transmitting a reply to the call set-up signaling from the BS at the transmission power level set for the BS.

2. The method of claim 1, wherein step (c) comprises:
   setting the transmission power level of the MS substantially to a maximum level at which the MS is capable of transmitting.

3. The method of claim 2, wherein step (d) comprises:
   transmitting the call set-up signaling from the MS on a reverse control channel utilized by the wireless network.

4. The method of claim 3, wherein step (f) comprises:
   setting the transmission power level of the BS substantially to a maximum level at which the BS is capable of transmitting.

5. The method of claim 4, wherein step (g) comprises:
   transmitting the reply to the call set-up signaling from the BS on a forward control channel, said forward control channel being a corresponding counterpart to the reverse control channel over which the BS received the call set-up signaling from the MS.

6. The method of claim 5, wherein the method further comprises:
   (h) determining whether or not the MS receives the reply transmitted from the BS in step (g).

7. The method of claim 6, wherein the method further comprises:
   (i) in response to the MS receiving the reply, switching the MS to a free traffic channel designated in the reply.

8. The method of claim 7, wherein the method further comprises:
   (j) returning the transmission power level of the BS for the forward control channel to a normal operational level.

9. The method of claim 8, wherein the method further comprises:
   (k) adjusting the transmission power level of the BS for the designated traffic channel based upon a detected power of the call set-up signaling received by the BS from the MS.

10. The method of claim 3, wherein the method further comprises:
    (h) changing the reverse control channel and repeating step (d) if no reply to the call set-up signaling is received by the MS.

11. The method of claim 10, wherein a first reverse control channel selected for transmitting the call set-up signaling is the same as the one most recently used last by the MS to successful communicate with the wireless network.

12. In a wireless telecommunications network, a system for regulating transmission power levels for wireless calls, said system comprising:
    first determining means for determining whether or not a mobile station (MS) is outside a service area of a wireless telecommunications network;
    detecting means for detecting whether or not a call placed by the MS is a priority call;

first power level setting means for setting a transmission power level of the MS in response to the MS being outside the service area of the wireless network and detecting that the call placed by the MS is a priority call;

first transmitting means for transmitting call set-up signaling from the MS at the transmission power level set by the first power level setting means;

second determining means for determining whether or not a base station (BS) of the wireless network receives the call set-up signaling from the MS;

second power level setting means for setting a transmission power level of the BS in response to the BS receiving the call set-up signaling from the first transmitting means; and, second transmitting means for transmitting a reply to the call set-up signaling, said reply being transmitted by the second transmitting means from the BS at the transmission power level set by the second power level setting means.

13. The system of claim 12, wherein the first power level setting means sets the transmission power level of the MS substantially to a maximum level at which the first transmitting means is capable of transmitting.

14. The system of claim 13, wherein the first transmitting means transmits the call set-up signaling from the MS on a reverse control channel utilized by the wireless network.

15. The system of claim 14, wherein the second power level setting means sets the transmission power level of the BS substantially to a maximum level at which the second transmitting means is capable of transmitting.

16. The system of claim 15, wherein the second transmitting means transmits the reply to the call set-up signaling from the BS on a forward control channel, said forward control channel being a corresponding counterpart to the reverse control channel over which the BS received the call set-up signaling from the MS.

17. The system of claim 16, wherein the system further comprises:
    second determining means for determining whether or not the MS receives the reply transmitted from the BS.

18. The system of claim 17, wherein the system further comprises:
    switching means that, in response to the MS receiving the reply, switches the first transmitting means to a free traffic channel designated in the reply.

19. The system of claim 18, wherein the first power level setting means returns the transmission power level of the BS for the forward control channel to a normal operational level after the switching means switches the first transmitting means to the designated traffic channel.

20. The system of claim 19, wherein the system further comprises:
    power level adjusting means for adjusting the transmission power level of the BS for the designated traffic channel based upon a detected power of the call set-up signaling received by the BS from the MS.

* * * * *